(12) United States Patent
Lei

(10) Patent No.: US 12,543,194 B2
(45) Date of Patent: Feb. 3, 2026

(54) METHOD AND APPARATUS FOR FEEDBACK TIMING INDICATION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 357 days.

(21) Appl. No.: 18/246,924

(22) PCT Filed: Sep. 29, 2020

(86) PCT No.: PCT/CN2020/118700
§ 371 (c)(1),
(2) Date: Mar. 28, 2023

(87) PCT Pub. No.: WO2022/067465
PCT Pub. Date: Apr. 7, 2022

(65) Prior Publication Data
US 2023/0413285 A1    Dec. 21, 2023

(51) Int. Cl.
*H04W 72/232* (2023.01)
*H04L 1/1812* (2023.01)
*H04W 72/1273* (2023.01)
*H04W 74/0816* (2024.01)

(52) U.S. Cl.
CPC ......... *H04W 72/232* (2023.01); *H04L 1/1812* (2013.01); *H04W 72/1273* (2013.01); *H04W 74/0816* (2013.01)

(58) Field of Classification Search
None
See application file for complete search history.

(56) References Cited

U.S. PATENT DOCUMENTS

| 2019/0363836 | A1  | 11/2019 | Park |
| 2021/0045105 | A1* | 2/2021  | Yoon ................ H04W 72/21 |
| 2023/0141338 | A1* | 5/2023  | Lin .................. H04L 1/1822 |
| | | | 370/329 |
| 2023/0284234 | A1* | 9/2023  | Fu .................... H04L 1/1614 |
| | | | 370/329 |

(Continued)

FOREIGN PATENT DOCUMENTS

CN          111357350          6/2020

OTHER PUBLICATIONS 20955493.0, "Extended European Search Report", EP Application No. 20955493.0, May 17, 2024, 9 pages.

(Continued)

*Primary Examiner* — Srinivasa R Reddivalam
(74) *Attorney, Agent, or Firm* — FIG. 1 Patents

(57) ABSTRACT

Embodiments of the present disclosure relate to methods and apparatuses for HARQ-ACK feedback timing indication. According to some embodiments of the receiving, from a base station (BS), a first downlink control information (DCI) format for scheduling a physical downlink shared channel (PDSCH) in a first slot, wherein the first DCI format includes a first indicator for the UE to determine a second slot for transmitting hybrid automatic repeat request acknowledgement (HARQ-ACK) feedback corresponding to the PDSCH; and transmitting, to the BS, the HARQ-ACK feedback in a physical uplink control channel (PUCCH) in the second slot.

20 Claims, 8 Drawing Sheets

(56) References Cited

U.S. PATENT DOCUMENTS

2023/0299891 A1* 9/2023 Kittichokechai ..... H04L 1/1896 370/336

OTHER PUBLICATIONS

Huawei, "HARQ enhancements in NR unlicensed", 3GPP TSG RAN WG1 Ad-Hoc Meeting 1901, R1-1900062, Taipei [https://www.3gpp.org/ftp/tsg_ran/WG1_RL1/TSGR1_AH/NR_AH_1901/Docs], Jan. 2019, 11 pages.

Spreadtrum Communications, "Discussion on HARQ enhancements in NR-U", 3GPP TSG RAN WG1 Ad-Hoc Meeting 1901, R1-1900706, Taipei [https://www.3gpp.org/ftp/tsg_ran/WG1_RL1/TSGR1_AH/NR_AH_1901/Docs], Jan. 2019, 5 pages.

ZTE, et al., "Discussion on scheduling and HARQ for NR-U", 3GPP TSG RAN WG1 #96bis, R1-1903875, Xi'an, China [https://www.3gpp.org/ftp/tsg_ran/wg1_rl1/TSGR1_96b/Docs/], Apr. 2019, 7 pages.

Ericsson, "Other Enhancements to Uplink and Downlink Transmissions for NR URLLC", 3GPP TSG RAN WG1 Meeting #98bis, R1-1910551, Chongqing, China [retrieved Feb. 21, 2023]. Retrieved from the Internet <https://www.3gpp.org/ftp/tsg_ran/WG1_RL1/TSGR1_98b/Docs>., Oct. 2019, 5 Pages.

Huawei, et al., "Discussion on physical layer control procedures for NTN", 3GPP TSG RAN WG1 Meeting #98bis, R1-1910063, Chongqing, China [retrieved Feb. 21, 2023]. Retrieved from the Internet <https://www.3gpp.org/ftp/tsg_ran/WG1_RL1/TSGR1_98b/Docs>., Oct. 2019, 4 Pages.

PCT/CN2020/118700, "International Preliminary Report on Patentability", PCT Application No. PCT/CN2020/118700, Apr. 13, 2023, 5 pages.

PCT/CN2020/118700, "International Search Report and Written Opinion", PCT Application No. PCT/CN2020/118700, Jun. 24, 2021, 6 pages.

* cited by examiner

METHOD AND APPARATUS FOR FEEDBACK TIMING INDICATION

TECHNICAL FIELD

Embodiments of the present disclosure generally relate to wireless communication technology, and more particularly to hybrid automatic repeat request acknowledgement (HARQ-ACK) feedback timing indication.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH) in one or more search spaces. The PDCCH may carry downlink control information (DCI) from a base station (BS). The DCI may schedule uplink channels, such as a physical uplink shared channel (PUSCH), or downlink channels, such as a physical downlink shared channel (PDSCH). A UE may transmit hybrid automatic repeat request acknowledgement (HARQ-ACK) feedback (e.g., included in a HARQ-ACK codebook) corresponding to PDSCH transmissions through a physical uplink shared channel (PUSCH) or physical uplink control channel (PUCCH).

There is a need for indicating the timing for transmitting the HARQ-ACK feedback in a wireless communication system.

SUMMARY

Some embodiments of the present disclosure provide a method for wireless communications performed by a user equipment (UE). The method may include: receiving, from a base station (BS), a first downlink control information (DCI) format for scheduling a physical downlink shared channel (PDSCH) in a first slot, wherein the first DCI format includes a first indicator for the UE to determine a second slot for transmitting hybrid automatic repeat request acknowledgement (HARQ-ACK) feedback corresponding to the PDSCH; and transmitting, to the BS, the HARQ-ACK feedback in a physical uplink control channel (PUCCH) in the second slot.

Some embodiments of the present disclosure provide a method for wireless communications performed by a base station (BS). The method may include: transmitting, to a user equipment (UE), a first downlink control information (DCI) format for scheduling a physical downlink shared channel (PDSCH) in a first slot, wherein the first DCI format includes a first indicator for the UE to determine a second slot for transmitting hybrid automatic repeat request acknowledgement (HARQ-ACK) feedback corresponding to the PDSCH; and receiving, from the UE, the HARQ-ACK feedback in a physical uplink control channel (PUCCH) in the second slot.

In some embodiments of the present disclosure, the first slot may be within a downlink (DL) burst of a channel occupancy time (COT) and the second slot is within an uplink (UL) burst of the COT.

In some embodiments of the present disclosure, the first indicator may indicate one of the following: an offset between a slot where the UL burst starts and the second slot; an offset between a slot where the DL burst ends and the second slot; and an offset between a slot where the COT ends and the second slot. The method may further include transmitting a second DCI format for indicating one of the following: the slot where the UL burst starts, the slot where the DL burst ends, the remaining duration of the COT, the slot where the COT ends, and a structure of the DL burst and the UL burst of the COT.

In some embodiments of the present disclosure, the first indicator may indicate a value from a first HARQ-ACK feedback timing value set among a plurality of HARQ-ACK feedback timing value sets. The first DCI format may further include a second indicator indicating the first HARQ-ACK feedback timing value set. A code point of the second indicator may indicate that a slot for transmitting the HARQ-ACK feedback is not available. The first HARQ-ACK feedback timing value set may include an inapplicable HARQ-ACK feedback timing value for indicating that a slot for transmitting the HARQ-ACK feedback is not available. The method may further include transmitting the plurality of HARQ-ACK feedback timing value sets to the UE by radio resource control (RRC) signaling. Each of the plurality of HARQ-ACK feedback timing value sets may be configured or predefined to be associated with a subcarrier spacing (SCS). The first HARQ-ACK feedback timing value set may be associated with the SCS of the PUCCH or the PDSCH.

In some embodiments of the present disclosure, the method may further include determining a time unit of HARQ-ACK feedback timing value. The HARQ-ACK feedback timing value may be indicated by the first indicator from a HARQ-ACK feedback timing value set. The second slot may be based on an offset with reference to the first slot and the offset may be determined based on the time unit and the HARQ-ACK feedback timing value. In some examples, the time unit may be configured by radio resource control (RRC) signaling from a set of candidate values. In some examples, the time unit may be associated with a subcarrier spacing (SCS) of the PDSCH or the PUCCH. In some examples, the time unit may be indicated by the first DCI format from a set of candidate values.

In some embodiments of the present disclosure, both the first slot and the second slot may be within a COT and the maximum duration of the COT is equally divided to a number of the time segments. The first indicator may indicate a HARQ-ACK feedback timing value from a HARQ-ACK feedback timing value set, and the HARQ-ACK feedback timing value set may be based on the number of time segments. In some examples, the method may further include transmitting the number of time segments within the maximum duration of the COT to the UE by radio resource control (RRC) signaling. In some examples, the method may further include transmitting the HARQ-ACK feedback timing value set to the UE by RRC signaling. In some examples, the HARQ-ACK feedback timing value set may be predefined. In some examples, the number of time segments within the maximum duration of the COT may be predefined.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
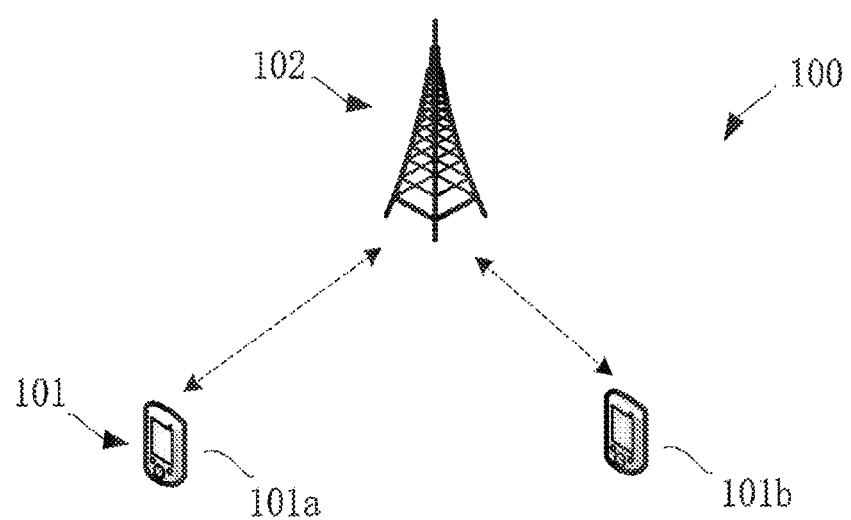
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100) is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 will expand the frequency range to 71 GHz. Due to the phase noise effect at a high frequency band, higher subcarrier spacing (SCS) may be specified for the purpose of reliability. For example, 240 kHz SCS, 480 kHz SCS, 960 kHz SCS, and even 1920 kHz SCS may be considered. It is known that the higher the SCS, the shorter the duration of a slot. Moreover, in some embodiments of the present disclosure, the maximum channel occupancy time (MCOT) may be no greater than 5 ms. The number of slots within an MCOT is dependent on the SCS.

For example, Table 1 below shows exemplary slot durations for different SCS. It should be understood that Table 1 is only for illustrative purposes, and should not be construed as limiting the embodiments of the present disclosure.

TABLE 1

Slot durations for different SCS

| μ | $\Delta f = 2^\mu \cdot 15$[kHz] | Slot duration | Number of slots within 5 ms MCOT |
|---|---|---|---|
| 0 | 15 | 1 ms | 5 |
| 1 | 30 | 0.5 ms | 10 |
| 2 | 60 | 0.25 ms | 20 |
| 3 | 120 | 0.125 ms | 40 |
| 4 | 240 | 0.0625 ms | 80 |
| 5 | 480 | 31.25 μs | 160 |
| 6 | 960 | 15.625 μs | 320 |

In the above Table 1, parameter p is associated with the SCS (listed in the second column of Table 1). For example, "μ=4" may indicate a SCS of 240 kHz, and the slot duration for such SCS is 0.0625 ms.

In the above Table 1, it is assumed that the MCOT is 5 ms. However, it should be appreciated by persons skilled in the art that the MCOT may be other values, according to the standards adopted. As shown in the above Table 1, 160 slots may be contained in a 5 ms MCOT in case of 480 kHz SCS, or 320 slots may be contained in a 5 ms MCOT in case of 960 kHz SCS.

On the other hand, in some embodiments of the present disclosure, a DCI format may include up to 3 bits to indicate HARQ-ACK feedback timing in the slot level (hereinafter, "PDSCH-to-HARQ_feedback timing indicator"). This slot level offset indicates the number of slots between the slot where a PDSCH is scheduled and the slot where the corresponding HARQ-ACK feedback is supposed to be transmitted. In some examples, the PDSCH-to-HARQ_feedback timing indicator can indicate a value from a set (hereinafter, "K1 set") including a maximum of 8 values. These maximum 8 values may be selected from 0 to 15, for example, {1,2,3,4,5,6,7,8}. In some cases, the K1 set may be configured to a UE via a radio resource control (RRC) signaling message (for example, indicated by the dl-DataToUL-ACK parameter as defined in relevant 3GPP standards). In some cases, the K1 set may be predefined, for example, in a standard(s).

For example, in the case that a UE detects a DCI format scheduling a PDSCH reception ending in slot n or in the case the UE detects a DCI format (e.g., DCI format 1_0) indicating a semi-persistent scheduling (SPS) PDSCH release through a PDCCH reception ending in slot n, the UE may provide corresponding HARQ-ACK feedback in an uplink transmission (e.g., PUCCH) within slot n+k, where k is the number of slots (slot level offset) and may be indicated by the PDSCH-to-HARQ_feedback timing indicator field in the DCI format (if present) or provided by dl-DataToUL-ACK.

Table 2 below shows an exemplary mapping between the PDSCH-to-HARQ_feedback timing indicator and the number of slots in the K1 set. It should be understood that Table 2 is only for illustrative purposes, and should not be construed as limiting the embodiments of the present disclosure.

TABLE 2

Mapping of PDSCH-to-HARQ_feedback timing indicator to numbers of slots

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

According to above Table 2, when the PDSCH-to-HARQ_feedback timing indicator of a DCI format is '110', the UE may provide corresponding HARQ-ACK feedback in a PUCCH within slot n+k, where k is the $7^{th}$ value provided by dl-DataToUL-ACK.

Since the maximum 8 values are selected from 0 to 15, the maximum timing offset from a PDSCH transmission to the corresponding HARQ-ACK feedback transmission is 15 slots. In other words, for a PDSCH ending in slot n, the latest transmission timing of the corresponding HARQ-ACK feedback could be in slot n+15. This may lead to a great restriction on the transmission of HARQ-ACK feedback on both an unlicensed spectrum and a licensed spectrum since the duration of a single slot is quite short when a relatively high SCS is applied.

Figure 2:
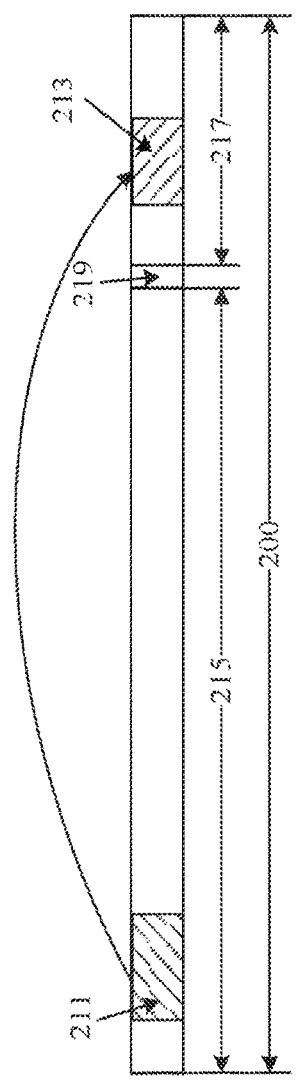
FIG. 2 illustrates an exemplary gNB-initiated channel occupancy time (COT) in accordance with some embodiments of the present disclosure.

For example, when an unlicensed spectrum in a high frequency band is used, the existing maximum 15 slots as a HARQ-ACK feedback offset between a PDSCH transmission and a corresponding HARQ-ACK feedback transmission are quite insufficient in a gNB-initiated channel occupancy time (COT) with high SCS. FIG. 2 illustrates an exemplary gNB-initiated COT 200 in accordance with some embodiments of the present disclosure.

Referring to FIG. 2, the COT 200 may include DL burst 215, UL burst 217, and DL-UL offset 219. A BS may transmit a DCI format (not shown in FIG. 2) to a UE. The DCI format may schedule PDSCH 211 in the DL burst 215, and may indicate a slot level offset such that the UE may transmit the corresponding HARQ-ACK feedback in PUCCH 213 in the UL burst 219.

Assuming that the 120 kHz SCS is adopted in FIG. 2, there are a maximum of 40 slots within a 5 ms MCOT. In this scenario, the slot level offset between the PDSCH transmission (e.g., PDSCH 211) and the corresponding HARQ-ACK feedback (e.g., PUCCH 217) is very likely larger than 15. This is especially true when the SCS is 240 kHz or 480 kHz, where up to 80 or 160 slots are contained in the 5 ms MCOT. In that sense, the HARQ-ACK feedback timing values should be increased greatly, so as to cover the possible slot level offset from 0 to 39, 79 or 159. Accordingly, the number of bits in the DCI format would also be increased greatly when, for example, 80 or 160 values are included in the possible HARQ-ACK feedback timing value set (e.g., K1 set). For example, when 80 values are configured (or predefined) to cover the value range from 0 to 79, 7 bits will be required in the DCI format. When 160 values are configured (or predefined) to cover the value range from 0 to 159, 8 bits will be required in the DCI format. As a result, a relatively high overhead for the DCI format is caused.

Solutions for indicating the timing of HARQ-ACK feedback that can be applied to both the licensed spectrum and the unlicensed spectrum are disclosed in the subject disclosure. The disclosed solutions are especially advantageous when high SCS is applied. More details on the embodiments of the present disclosure will be illustrated in the following text in combination with the appended drawings.

In some embodiments of the present disclosure, a DCI format scheduling a PDSCH may include an indicator (hereinafter, "HARQ-ACK feedback timing indicator") for the UE to determine a slot for transmitting HARQ-ACK feedback corresponding to the PDSCH.

For an unlicensed spectrum, the DCI format may be transmitted in a DL burst of a COT and the corresponding HARQ-ACK feedback may be carried in a UL channel (e.g., PUCCH or PUSCH) which is transmitted in a UL burst of the COT. In some embodiments of the present disclosure, for an unlicensed spectrum, the HARQ-ACK feedback timing indicator may indicate a slot level offset between the slot where the UL burst starts and the slot where the corresponding HARQ-ACK feedback is to be transmitted. In these embodiments, the HARQ-ACK feedback timing for the PDSCH is in reference to the starting slot of the UL burst, instead of the slot where the PDSCH is to be transmitted.

For example, a DCI format may schedule a PDSCH transmission in slot n and include a HARQ-ACK feedback timing indicator indicating a slot level offset k, which implies the corresponding HARQ-ACK feedback is to be transmitted in slot s+k, where the UL burst starts at slot s.

In the case of multiple DL-to-UL switching points in one COT, for a PDSCH transmitted in a DL burst, the corresponding HARQ-ACK feedback is to be transmitted in the immediately followed UL burst (that is, the first UL burst following the DL burst). That is, in this case, the HARQ-ACK feedback timing for the PDSCH is in reference to the starting slot of the immediately followed UL burst.

In these embodiments, a K1 set with candidate values selected based on the duration of the UL burst (e.g., the number of slots in the UL burst) may be configured to a UE via RRC signaling or may be predefined. In some examples, considering that there is generally more DL traffic than UL traffic, the UL burst is generally shorter than the DL burst. Moreover, sometimes, one COT may support multiple DL-to-UL switching points. In this scenario, 8 or 16 values (denoted as "X") in the K1 set indicating the range of the slot level offset from 0 to 7 or 0 to 15 may be enough. Accordingly, the HARQ-ACK feedback timing indicator will need 3 or 4 bits (e.g., $\lceil \log_2(X) \rceil$) to indicate a specific value from the K1 set.

Figure 3:
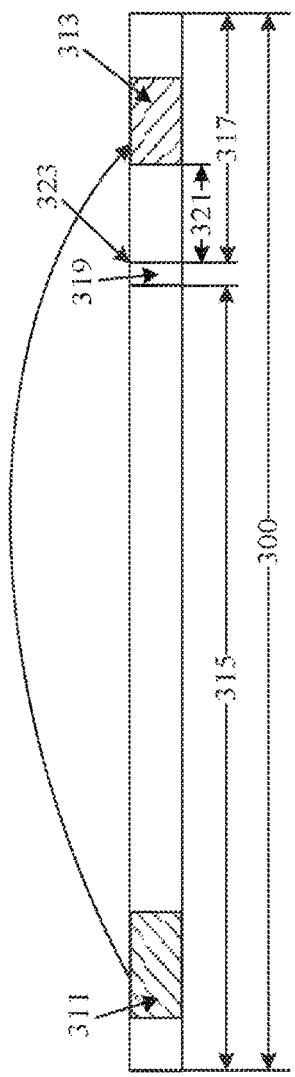
FIG. 3 illustrates an exemplary gNB-initiated COT in accordance with some embodiments of the present disclosure.

FIG. 3 illustrates an exemplary gNB-initiated COT 300 in accordance with some embodiments of the present disclosure.

Referring to FIG. 3, the COT 300 may include DL burst 315, UL burst 317, and DL-UL offset 319. A BS may transmit a DCI format (not shown in FIG. 3) to a UE. The DCI format may schedule PDSCH 311 in the DL burst 315 and include a HARQ-ACK feedback timing indicator with reference to the starting slot of UL burst 317. For example, the HARQ-ACK feedback timing indicator indicating a slot level offset 321 between the slot where the UL burst starts (e.g., at 323) and the slot where the corresponding HARQ-ACK feedback is to be transmitted.

The structure of the DL burst(s) and the UL burst(s) of a COT may be indicated in another DCI format, for example, a group-common DCI format such as DCI format 2_0. In some examples, the starting position(s) of the UL burst(s) may be indicated in, for example, COT structure signaling or a DL/UL burst split pattern in the another DCI format.

In some embodiments of the present disclosure, for an unlicensed spectrum, the HARQ-ACK feedback timing indicator in the DCI format may indicate a slot level offset between the slot where the DL burst ends and the slot where the corresponding HARQ-ACK feedback is to be transmitted. In these embodiments, the HARQ-ACK feedback timing for the PDSCH is in reference to the ending position (e.g., slot) of the DL burst, instead of the slot where the PDSCH is to be transmitted.

For example, a DCI format may schedule a PDSCH transmission in slot n and include a HARQ-ACK feedback timing indicator indicating a slot level offset k, which implies the corresponding HARQ-ACK feedback is to be transmitted in slot e+k, where the DL burst ends in slot e.

In the case of multiple DL-to-UL switching points in one COT, for a PDSCH transmitted in a DL burst, the corresponding HARQ-ACK feedback is to be transmitted in the immediately followed UL burst (that is, the first UL burst following the DL burst).

In these embodiments, a K1 set with candidate values selected based on the duration of the UL burst (e.g., the number of slots in the UL burst) may be configured to a UE via RRC signaling or may be predefined. In some examples, considering that there is generally more DL traffic than UL traffic, the UL burst is generally shorter than the DL burst. Moreover, sometimes, one COT may support multiple DL-to-UL switching points. In this scenario, 8 or 16 values (denoted as "X") in the K1 set indicating the range of the slot level offset from 0 to 7 or 0 to 15 may be enough. Accordingly, the HARQ-ACK feedback timing indicator will need 3 or 4 bits (e.g., $\lceil \log_2(X) \rceil$) to indicate a specific value from the K1 set.

Figure 4:
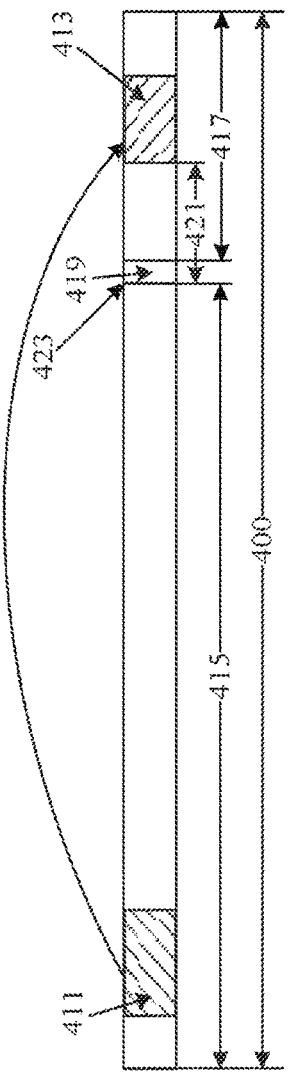
FIG. 4 illustrates an exemplary gNB-initiated COT in accordance with some embodiments of the present disclosure.

FIG. 4 illustrates an exemplary gNB-initiated COT 400 in accordance with some embodiments of the present disclosure.

Referring to FIG. 4, the COT 400 may include DL burst 415, UL burst 417, and DL-UL offset 419. A BS may transmit a DCI format (not shown in FIG. 4) to a UE. The DCI format may schedule PDSCH 411 in the DL burst 415 and include a HARQ-ACK feedback timing indicator with reference to the ending slot of the DL burst 415. For example, the HARQ-ACK feedback timing indicator indicating a slot level offset 421 between the slot where the DL burst ends (e.g., at 423) and the slot where the corresponding HARQ-ACK feedback is to be transmitted.

The structure of the DL burst(s) and the UL burst(s) of a COT may be indicated in another DCI format, for example, a group-common DCI format such as DCI format 2_0. In some examples, the ending position(s) of the DL burst(s) may be indicated in, for example, COT structure signaling or a DL/UL burst split pattern in the another DCI format.

In some embodiments of the present disclosure, for an unlicensed spectrum, the HARQ-ACK feedback timing indicator in the DCI format may indicate a slot level offset between the slot where the COT ends and the slot where the corresponding HARQ-ACK feedback is to be transmitted. In these embodiments, the HARQ-ACK feedback timing for the PDSCH is in reference to the ending position (e.g., slot) of the COT, instead of the slot where the PDSCH is to be transmitted. The above embodiments may be applicable to the scenario where a COT includes only a single DL-to-UL switching point.

For example, a DCI format may schedule a PDSCH transmission in slot n and include a HARQ-ACK feedback timing indicator indicating a slot level offset k, which implies the corresponding HARQ-ACK feedback is to be transmitted in slot m−|k|, where the COT ends in slot m and k can be either a positive integer or a negative integer.

In these embodiments, a K1 set with candidate values selected based on the duration of the UL burst (e.g., the number of slots in the UL burst) may be configured to a UE via RRC signaling or may be predefined. In some examples, considering that there is generally more DL traffic than UL traffic, the UL burst is generally shorter than the DL burst. In this scenario, 8 or 16 values (denoted as "X") in the K1 set indicating the range of the slot level offset from 0 to 7 or 0 to 15 may be enough. Accordingly, the HARQ-ACK feedback timing indicator will need 3 or 4 bits (e.g., $\lceil \log_2 (X) \rceil$) to indicate a specific value from the K1 set.

Figure 5:
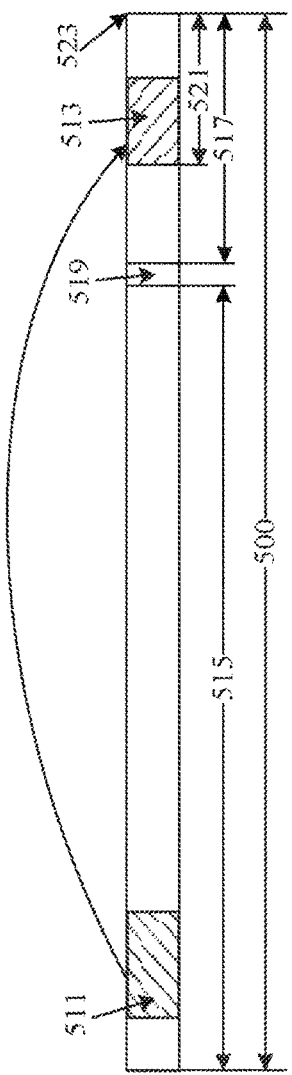
FIG. 5 illustrates an exemplary gNB-initiated COT in accordance with some embodiments of the present disclosure.

FIG. 5 illustrates an exemplary gNB-initiated COT 500 in accordance with some embodiments of the present disclosure.

Referring to FIG. 5, the COT 500 may include DL burst 515, UL burst 517, and DL-UL offset 519. A BS may transmit a DCI format (not shown in FIG. 5) to a UE. The DCI format may schedule PDSCH 511 in the DL burst 515 and include a HARQ-ACK feedback timing indicator with reference to the ending slot of the COT 500. For example, the HARQ-ACK feedback timing indicator indicating a slot level offset 521 between the slot where the COT 500 ends (e.g., at 523) and the slot where the corresponding HARQ-ACK feedback is to be transmitted.

The ending position of the COT may be indicated in another DCI format, for example, a group-common DCI format such as DCI format 2_0. In some examples, a DCI format 2_0 may include a field (e.g., CO-duration field) indicating the remaining channel occupancy duration (e.g., the number of symbols) of the COT (e.g., for the serving cell). The duration may be calculated from the first symbol (e.g., symbol 0) of a slot where the UE detects the DCI format 2_0. Based on the remaining COT duration in the DCI format 2_0, a UE can determine the slot where the COT ends.

In the above embodiments, in some examples, the K1 set may include an inapplicable HARQ-ACK feedback timing value (e.g., a non-numerical value, an infinity value or a negative value), which indicates that a slot for transmitting the HARQ-ACK feedback is not available. In some examples, a code point of the HARQ-ACK feedback timing indicator may be reserved to indicate that a slot for transmitting the HARQ-ACK feedback is not available. For example, the HARQ-ACK feedback timing indicator may indicate a value (e.g., 7) different from the values (e.g., 0-6) indicated in the K1 set. In response to a DCI format scheduling a PDSCH and indicating the inapplicable value or the reserved code point of the HARQ-ACK feedback timing indicator, the UE should wait for another DCI format indicating an applicable HARQ-ACK feedback timing value or an applicable HARQ-ACK feedback timing indicator to transmit the HARQ-ACK feedback corresponding to the PDSCH.

In some embodiments of the present disclosure, for both an unlicensed spectrum and a licensed spectrum, a plurality of HARQ-ACK feedback timing value sets (e.g., a plurality of K1 sets) may be configured to a UE via RRC signaling or may be predefined. The values in a K1 set may indicate a slot level offset between the slot where the PDSCH is scheduled and the slot where the corresponding HARQ-ACK feedback is to be transmitted. The plurality of K1 sets may cover different HARQ-ACK feedback timing ranges. The HARQ-ACK feedback timing indicator in the DCI format may indicate a HARQ-ACK feedback timing value from a specific K1 set among the plurality of K1 sets. The following text will describe how to determine the specific K1 set and the specific HARQ-ACK feedback timing value.

In some embodiments of the present disclosure, the DCI format may further include another indicator (hereinafter. HARQ-ACK feedback timing set indicator (TSI)) to indicate the specific K1 set from the plurality of K1 sets. The HARQ-ACK feedback timing indicator in the DCI format indicates a specific HARQ-ACK feedback timing value from the K1 set indicated by the TSI. Denoting the maximum number of K1 sets in the plurality of K1 sets and the maximum number of HARQ-ACK feedback timing values in each of the plurality of K1 sets as M and N respectively, in a DCI format, the TSI may require $\lceil \log_2 M \rceil$ bits and the HARQ-ACK feedback timing indicator may require $\lceil \log_2 N \rceil$ bits.

Assuming that a PDSCH ends in slot n, in the case that the BS intends to schedule a UE to transmit the corresponding HARQ-ACK feedback in slot n+k, there may not be a value of k in the K1 set indicated by the TSI, due to the limitation of up to N values in one K1 set. To solve this problem, in some examples, a code point of the TSI or a code point of the HARQ-ACK feedback timing indicator may be reserved to indicate that the HARQ-ACK feedback timing value is not available in the monitoring occasion of the current DCI format. In some examples, at least one of the plurality of K1 sets may include an inapplicable HARQ-ACK feedback timing value (e.g., a non-numerical value, an infinity value or a negative value), which indicates that a slot for transmitting the HARQ-ACK feedback is not available. In response to a DCI format scheduling a PDSCH and indicating the reserved code point of the TSI or the HARQ-ACK feedback timing indicator or the inapplicable value, the UE should wait for another DCI format indicating an applicable HARQ-ACK timing set or an applicable HARQ-ACK feedback timing value to transmit the HARQ-ACK feedback corresponding to the PDSCH.

Taking the 5 ms MCOT as an example, in some instances, four K1 sets can be configured and each K1 set can include eight values. For example, the first K1 set can be configured with 8 values to cover the value range from 0 to 15 for 60 kHz SCS and each of the 8 values is configured with 4 bits. The second K1 set can be configured with 8 values to cover the value range from 0 to 31 for 120 kHz SCS and each of the 8 values is configured with 5 bits. The third K1 set can be configured with 8 values to cover the value range from 0 to 63 for 240 kHz SCS and each of the 8 values is configured with 6 bits. The fourth K1 set can be configured with 8 values to cover the value range from 0 to 127 for 480 kHz SCS and each of the 8 values is configured with 7 bits. Although the above example shows that each K1 set is associated with a respective SCS, it is contemplated that the K1 set may not necessarily be associated with the SCS.

In the above example, the TSI field in a DCI format may include 2 bits ($\lceil \log_2(4) \rceil$) and may indicate one of the four K1 sets. The HARQ-ACK feedback timing indicator field in a DCI format may include 3 bits ($\lceil \log_2(8) \rceil$) and may indicate a HARQ-ACK feedback timing value from the K1 set indicated by the TSI. In some other instances, each K1 set can include 16 values. The HARQ-ACK feedback timing indicator field in a DCI format may include 4 bits ($\lceil \log_2(16) \rceil$).

In some embodiments of the present disclosure, instead of introducing a TSI field into the DCI format, each of the plurality of K1 sets may be configured or predefined to be associated with a respective SCS. In some embodiments, each K1 set may be explicitly configured (or predefined) with a corresponding SCS. For example, when a K1 set is configured (or predefined), a corresponding SCS is configured (or predefined) together. In some embodiments, the association between the SCS and the plurality of K1 sets may be predefined, for example, in a standard (s). For example, the first K1 set in the plurality of K1 sets may be defined for 60 kHz SCS; the second K1 set in the plurality of K1 sets may be defined for 120 kHz SCS; the third K1 set in the plurality of K1 sets may be defined for 240 kHz SCS; and the fourth K1 set in the plurality of K1 sets may be defined for 480 kHz SCS.

The HARQ-ACK feedback timing indicator in the DCI format may indicate a HARQ-ACK feedback timing value from a specific K1 set of the plurality of K1 sets. The specific K1 set may be associated with the SCS of the PDSCH scheduled by the DCI format or the SCS of the PUCCH carrying the HARQ-ACK feedback.

Denoting the maximum number of HARQ-ACK feedback timing values in each of the plurality of K1 sets as N, the HARQ-ACK feedback timing indicator in a DCI format may require $\lceil \log_2 N \rceil$ bits.

Assuming that a PDSCH ends in slot n, in the case that the BS intends to schedule a UE to transmit the corresponding HARQ-ACK feedback in slot n+k, there may not be a value of k in the specific K1 set, due to the limitation of up to N values in one K1 set. To solve this problem, in some examples, a code point of the HARQ-ACK feedback timing indicator may be reserved to indicate that the HARQ-ACK feedback timing value is not available in the monitoring occasion of the current DCI format. In some examples, at least one of the plurality of K1 sets may include an inapplicable HARQ-ACK feedback timing value (e.g., a non-numerical value, an infinity value or a negative value), which indicates that a slot for transmitting the HARQ-ACK feedback is not available. In response to a DCI format scheduling a PDSCH and indicating the reserved code point of the HARQ-ACK feedback timing indicator or the inapplicable value, the UE should wait for another DCI format indicating an applicable HARQ-ACK feedback timing value to transmit the HARQ-ACK feedback corresponding to the PDSCH.

Taking the 5 ms MCOT as an example, in some instances, four K1 sets can be configured and each K1 set can include eight values. For example, the first K1 set can be configured with 8 values to cover the value range from 0 to 15 for 60 kHz SCS and each of the 8 values is configured with 4 bits. The second K1 set can be configured with 8 values to cover the value range from 0 to 31 for 120 kHz SCS and each of the 8 values is configured with 5 bits. The third K1 set can be configured with 8 values to cover the value range from 0 to 63 for 240 kHz SCS and each of the 8 values is configured with 6 bits. The fourth K1 set can be configured with 8 values to cover the value range from 0 to 127 for 480 kHz SCS and each of the 8 values is configured with 7 bits. As described above, the association between the SCS and the K1 sets may be explicitly configured or implicitly determined.

In the above example, the HARQ-ACK feedback timing indicator field in a DCI format may include 3 bits ($\lceil \log_2(8) \rceil$) and may indicate a HARQ-ACK feedback timing value from a K1 set determined based on a corresponding SCS. In some other instances, each K1 set can include 16 values. The HARQ-ACK feedback timing indicator field in a DCI format may include 4 bits ($\lceil \log_2(16) \rceil$).

In some embodiments of the present disclosure, for both an unlicensed spectrum and a licensed spectrum, a HARQ-ACK feedback timing value set (K1 set) may be configured to a UE via RRC signaling or may be predefined. The HARQ-ACK feedback timing indicator in the DCI format may indicate a specific HARQ-ACK feedback timing value from the K1 set. A time unit (hereinafter, denoted as "Z") is introduced to apply to (e.g., by multiplication) the values in the K1 set. The result of the multiplication may indicate the slot level offset between the slot where the PDSCH is scheduled and the slot where the corresponding HARQ-ACK feedback is to be transmitted. In this way, the actual values in the K1 set can be flexibly changed.

For example, assuming the K1 set is {1, 2, 3, 4, 5, 6, 7, 8}, after multiplying with Z, the actual K1 set is changed to {Z, 2Z, 3Z, 4Z, 5Z, 6Z, 7Z, 8Z}. When Z is set to 2, the actual K1 set is {2, 4, 6, 8, 10, 12, 14, 16}, which may be appropriate for 60 kHz SCS with a maximum of 20 slots within a 5 ms MCOT When Z is set to 4, the actual K1 set is {4, 8, 12, 16, 20, 24, 28, 32}, which may be appropriate for 120 kHz SCS with a maximum of 40 slots within a 5 ms MCOT. When Z is set to 8, the actual K1 set is {8, 16, 24, 32, 40, 48, 56, 64}, which may be appropriate for 240 kHz SCS with a maximum of 80 slots within a 5 ms MCOT. When Z is set to 16, the actual K1 set is {16, 32, 48, 64, 80, 96, 112, 128}, which may be appropriate for 480 kHz SCS with a maximum of 160 slots within a 5 ms MCOT. The HARQ-ACK feedback timing indicator in the DCI format indicates a specific HARQ-ACK feedback timing value from the K1 set or the actual K1 set. For example, in the case that Z is set to 4, the HARQ-ACK feedback timing indicator being 0 may indicate a slot level offset of 4.

Regarding the setting of Z, in some embodiments, Z may be configured by RRC signaling from a set of candidate values (e.g., 1, 2, 4, 8, 16, 32, and so on). In some other embodiments, Z may be implicitly determined based on the SCS of, for example, the PDSCH scheduled by the DCI format or the PUCCH carrying the HARQ-ACK feedback. For example, Z may be equal to 2 for 60 kHz SCS; Z may be equal to 4 for 120 kHz SCS; Z may be equal to 8 for 240 kHz SCS; or Z may be equal to 16 for 480 kHz SCS. In yet other embodiments, the DCI format may indicate the value of Z from a set of candidate values, which may be configured to the UE via RRC signaling or may be predefined. For example, a BS may transmit a RRC signaling message to a UE to configure the set of candidate values (e.g., {2, 4, 8, 16}). A DCI format may include a certain number of bits (e.g., 2 bits in the case of 4 values in the candidate set) to indicate one value from the set of candidate values.

Assuming that a PDSCH ends in slot n, in the case that the BS intends to schedule a UE to transmit the corresponding HARQ-ACK feedback in slot n+k, there may not be a value of k in the actual K1 set, due to the limited values in the K1 set. To solve this problem, several solutions can be adopted. In some examples, a code point of the HARQ-ACK feedback timing indicator or the time unit Z may be reserved to indicate that the HARQ-ACK feedback timing value is not available in the monitoring occasion of the current DCI format. In some examples, the K1 set or the set of candidate values for the time unit Z may include an inapplicable HARQ-ACK feedback timing value (e.g., a non-numerical value, an infinity value or a negative value), which indicates that a slot for transmitting the HARQ-ACK feedback is not available. In response to a DCI format scheduling a PDSCH and indicating the reserved code point of the HARQ-ACK feedback timing indicator or the time unit Z, or the inapplicable value, the UE should wait for another DCI format indicating an applicable HARQ-ACK feedback timing value or an applicable time unit to transmit the HARQ-ACK feedback corresponding to the PDSCH.

In some embodiments of the present disclosure, for an unlicensed spectrum, both the DCI format and the corresponding HARQ-ACK feedback may be transmitted in a COT.

In some embodiments of the present disclosure, a HARQ-ACK feedback timing value set (e.g., K1 set) may be configured to a UE via RRC signaling or may be predefined. The number of slots within the maximum duration of the COT is equally divided by the number of values in the K1 set such that the duration of the maximum duration of the COT is equally divided into a plurality of time segments. Each of the plurality of time segments may include an integer number of slots. The values in the K1 set may be selected from respective time segments. In some examples, the first slot (or the second, third, etc.) of each time segment may be included in the K1 set. The HARQ-ACK feedback timing indicator in the DCI format may indicate a specific value from the K1 set, and thus select a HARQ-ACK feedback timing value from a corresponding time segment. The HARQ-ACK feedback timing value is with reference to the slot where the PDSCH is scheduled. That is, the HARQ-ACK feedback timing value indicates the slot level offset between the slot where the PDSCH is scheduled and the slot where the corresponding HARQ-ACK feedback is to be transmitted.

For example, denoting the maximum number of HARQ-ACK feedback timing values in a K1 sets as N, where N may be the power of 2, and denoting the number of slots in a 5 ms MCOT as Y, the 5 ms MCOT is divided into N time segments with each segment having Y/N slots. When the values in the K1 set are selected from the first slot of each time segment, the K1 set may be configured (or predefined) as $$\left\{0, \frac{Y}{N}, 2*\frac{Y}{N}, \ldots, (N-1)*\frac{Y}{N}\right\}.$$

When the values of the K1 set are selected from the second slot of each time segment, the K1 set may be configured (or predefined) as $$\left\{1, \frac{Y}{N}+1, 2*\frac{Y}{N}-1, \ldots, (N-1)*\frac{Y}{N}-1\right\}.$$

In some embodiments, the K1 set may include an inapplicable HARQ-ACK feedback timing value (e.g., a non-numerical value, an infinity value or a negative value), which indicates that a slot for transmitting the HARQ-ACK feedback is not available. For example, the K1 set may be configured as $$\left\{NA, \frac{Y}{N}, 2*\frac{Y}{N}, \ldots, (N-1)*\frac{Y}{N}\right\},$$

where "NA" indicates that the HARQ-ACK feedback timing value is not available in the monitoring occasion of the current DCI format. In some embodiments, a code point of the HARQ-ACK feedback timing indicator may be reserved to indicate that a slot for transmitting the HARQ-ACK feedback is not available. In response to a DCI format scheduling a PDSCH and indicating the reserved code point of the HARQ-ACK feedback timing indicator or the inapplicable value, the UE should wait for another DCI format indicating an applicable HARQ-ACK feedback timing indicator or an applicable HARQ-ACK feedback timing value to transmit the HARQ-ACK feedback corresponding to the PDSCH.

In some embodiments of the present disclosure, instead of configuring or predefining a K1 set including values selected from a plurality of time segments, the number of the time segments (e.g., N) within the maximum duration of the COT (e.g., MCOT) may be configured to a UE via RRC signaling or may be predefined. The number of slots within the maximum duration of the COT is divided by the value N, where N may be the power of 2. In this way, the duration of the MCOT is equally divided into the number of the time segments. Each of the plurality of time segments may include an integer number of slots. Thus, a K1 set can be determined based on the number of the time segments. For example, the values in the K1 set may be selected from respective time segments. In some examples, the first slot (or the second, third, etc.) of each time segment may be included in the K1 set. The HARQ-ACK feedback timing indicator in the DCI format may indicate a specific value from the determined K1 set, and thus select a HARQ-ACK feedback timing value from a corresponding time segment. The HARQ-ACK feedback timing value is with reference to the slot where the PDSCH is scheduled.

For example, denoting the number of slots in a 5 ms MCOT as Y, the 5 ms MCOT is divided into N time segments with each segment having Y/N slots. When the values in the K1 set are selected from the first slot of each time segment, the K1 set may be determined as $$\left\{0, \frac{Y}{N}, 2*\frac{Y}{N}, \ldots, (N-1)*\frac{Y}{N}\right\}.$$

When the values of the K1 set are selected from the second slot of each time segment, the K1 set may be determined as $$\left\{1, \frac{Y}{N}+1, 2*\frac{Y}{N}+1, \ldots, (N-1)*\frac{Y}{N}+1\right\}.$$

The positions (e.g., the first slot, the second slot or any other slots in each time segment) of the K1 set values in each segment may be predefined, indicated in the DCI format, or configured via RRC signaling.

In some embodiments, the K1 set may be determined to include an inapplicable HARQ-ACK feedback timing value (e.g., a non-numerical value, an infinity value or a negative value), which indicates that a slot for transmitting the HARQ-ACK feedback is not available. For example, in some cases, the first value in a K1 set may be an inapplicable and the K1 set may be determined as $$\left\{NA, \frac{Y}{N}, 2*\frac{Y}{N}, \ldots, (N-1)*\frac{Y}{N}\right\},$$

where "NA" indicates that the HARQ-ACK feedback timing value is not available in the monitoring occasion of the current DCI format. In some embodiments, a code point of the HARQ-ACK feedback timing indicator may be reserved to indicate that a slot for transmitting the HARQ-ACK feedback is not available. In response to a DCI format scheduling a PDSCH and indicating the inapplicable value or the reserved code point of the HARQ-ACK feedback timing indicator, the UE should wait for another DCI format indicating an applicable HARQ-ACK feedback timing value or an applicable HARQ-ACK feedback timing indicator to transmit the HARQ-ACK feedback corresponding to the PDSCH.

Figure 6:
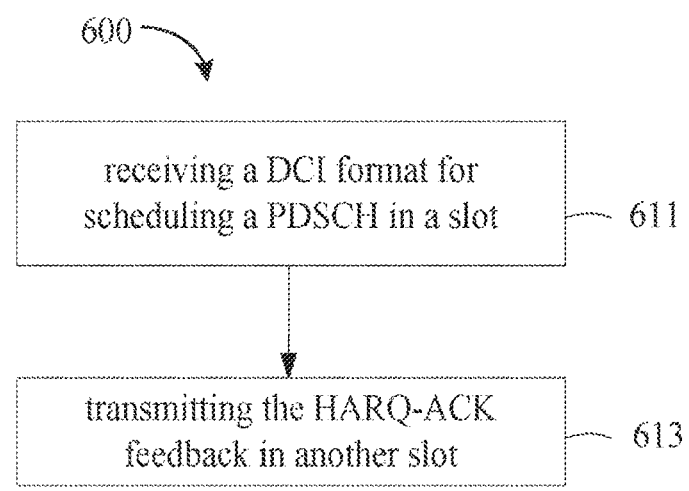
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. The procedure may be performed by a UE, for example, UE 101 in FIG. 1.

Referring to FIG. 6, in operation 611, a UE may receive a DCI format (hereinafter, "the first DCI format") for scheduling a PDSCH in a slot (hereinafter, "the first slot") from a BS. The first DCI format may include an indicator (hereinafter, "the first indicator") for the UE to determine another slot (hereinafter, "the second slot") for transmitting HARQ-ACK feedback corresponding to the PDSCH. The first indicator may be the HARQ-ACK feedback timing indicator as described above. The UE may determine the second slot for transmitting the corresponding HARQ-ACK feedback based at least on the first indicator according to one of the methods as described above.

In some embodiments, a code point of the first indicator may indicate that a slot for transmitting the HARQ-ACK feedback is not available. In response to the first indicator indicating such code point, the UE should wait for another DCI format indicating an applicable first indicator to transmit the HARQ-ACK feedback corresponding to the PDSCH.

For example, in some embodiments of the present disclosure, the UE and the BS may operate in an unlicensed spectrum. The first slot may be within a DL burst of a COT and the second slot may be within a UL burst of the COT.

The UE may receive a RRC signaling message from the BS to configure a HARQ-ACK feedback timing value set (e.g., K1 set); or the K1 set may be predefined. The UE may select a HARQ-ACK feedback timing value from the K1 set based on the first indicator. The first indicator may indicate one of an offset between a slot where the UL burst starts and the second slot, an offset between a slot where the DL burst ends and the second slot, and an offset between a slot where the COT ends and the second slot.

The UE may receive another DCI format (hereinafter, "the second DCI format") from the BS. The second DCI format may indicate the structure of the COT. For example, the second DCI format may one of the slot where the UL burst starts, the slot where the DL burst ends, the remaining duration of the COT, the slot where the COT ends, and a structure of the DL burst and the UL burst of the COT. The UE may determine the second slot for transmitting the corresponding HARQ-ACK feedback further based on the second DCI format. For example, the UE may determine the second slot based on the selected HARQ-ACK feedback timing value and the second DCI format.

In some embodiments, the K1 set may include an inapplicable HARQ-ACK feedback timing value (e.g., a non-numerical value, an infinity value or a negative value), which indicates that a slot for transmitting the HARQ-ACK feedback is not available. In response to the first DCI format (e.g., the first indicator) indicating such inapplicable value, the UE should wait for another DCI format indicating an applicable HARQ-ACK feedback timing value to transmit the HARQ-ACK feedback corresponding to the PDSCH.

In some embodiments of the present disclosure, the UE may receive a RRC signaling message from the BS to configure a plurality of HARQ-ACK feedback timing value sets (e.g., a plurality of K1 sets); or the plurality of K1 sets may be predefined. The values in the K1 sets may indicate a slot level offset between the slot where the PDSCH is scheduled and the slot where the corresponding HARQ-ACK feedback is to be transmitted. The first indicator in the DCI format may indicate a HARQ-ACK feedback timing value from a specific K1 set (hereinafter, "the first HARQ-ACK feedback timing value set") among the plurality of K1 sets.

In some examples, the DCI format may include another indicator (hereinafter, "the second indicator") indicating the first HARQ-ACK feedback timing value set. For example, the second indicator may be the TSI as described above.

In some embodiments, a code point of the second indicator may indicate that a slot for transmitting the HARQ-ACK feedback is not available. In some embodiments, the first HARQ-ACK feedback timing value set may include an inapplicable HARQ-ACK feedback timing value to indicate that a slot for transmitting the HARQ-ACK feedback is not available. In response to the second indicator indicating such code point or the first indicator indicating the inapplicable value, the UE should wait for another DCI format indicating an applicable HARQ-ACK timing set or an applicable HARQ-ACK feedback timing value to transmit the HARQ-ACK feedback corresponding to the PDSCH.

In some other examples, each of the plurality of K1 sets may be configured or predefined to be associated with a corresponding SCS. In some embodiments, each K1 set may be explicitly configured with a corresponding SCS. In some embodiments, each K1 set may be implicitly configured with a corresponding SCS. For example, the mapping between a K1 set and a corresponding SCS may be predefined. The first HARQ-ACK feedback timing value set may be associated with the SCS of the PUCCH carrying the HARQ-ACK feedback or the PDSCH scheduled by the first DCI format. That is, the UE may select the first HARQ-ACK feedback timing value set from the plurality of K1 sets based on the SCS of the PUCCH or the PDSCH.

In some embodiments, the first HARQ-ACK feedback timing value set may include an inapplicable HARQ-ACK feedback timing value to indicate that a slot for transmitting the HARQ-ACK feedback is not available. In response to the first indicator indicating such inapplicable value, the UE should wait for another DCI format indicating an applicable HARQ-ACK feedback timing value to transmit the HARQ-ACK feedback corresponding to the PDSCH.

In some embodiments of the present disclosure, the UE may receive a RRC signaling message from the BS to configure a HARQ-ACK feedback timing value set (e.g., a K1 set), or the K1 set may be predefined. The first indicator in the DCI format may indicate a HARQ-ACK feedback timing value from the K1 set. A time unit may be applied to the indicated HARQ-ACK feedback timing value. The second slot may be determined based on an offset with reference to the first slot, which may be determined based on the time unit and the indicated HARQ-ACK feedback timing value. For example, assuming that the K1 set is {1, 2, 3, 4, 5, 6, 7, 8}, the first indicator being 0 may indicate a first value (i.e., 1) in the K1 set. When the time unit is set to 4, the offset between the first slot and the second slot may be 1*4=4. That is, assuming that the first slot is in slot n, the second slot is in slot n+4.

In some examples, the time unit may be configured by RRC signaling from a set of candidate values. For example, the UE may receive a RRC signaling message indicate a specific candidate value from the BS. The BS may not need to notify the UE the set of candidate values. In some examples, the time unit may be associated with the SCS of the PUCCH carrying the HARQ-ACK feedback or the PDSCH scheduled by the first DCI format. For example, the UE may implicitly determine the time unit according to the SCS of the PUCCH or PDSCH. In some examples, the time unit may be indicated by the first DCI format from a set of candidate values. The set of candidate values may be configured to the UE via RRC signaling or may be predefined.

In some embodiments, a code point of the time unit may be reserved to indicate that the HARQ-ACK feedback timing value is not available in the monitoring occasion of the current DCI format. In some embodiments, the K1 set or the set of candidate values for the time unit may include an inapplicable value (e.g., a non-numerical value, an infinity value or a negative value), which indicates that a slot for transmitting the HARQ-ACK feedback is not available. In response to such code point or the inapplicable value, the UE should wait for another DCI format indicating an applicable time unit or an applicable HARQ-ACK feedback timing value to transmit the HARQ-ACK feedback corresponding to the PDSCH.

In some embodiments of the present disclosure, the UE and the BS may operate in an unlicensed spectrum. Both the first slot and the second slot may be within a COT. The maximum duration of the COT may be equally divided to a number of time segments. The first indicator may indicate a HARQ-ACK feedback timing value (e.g., a K1 set) from a HARQ-ACK feedback timing value set, which may be based on the number of time segments.

In some examples, the UE may receive a RRC signaling message from the BS to configure the K1 set; or the K1 set may be predefined. In some examples, the UE may receive a RRC signaling message from the BS to configure the number of time segments within the maximum duration of the COT; or the number of time segments may be predefined.

In some embodiments, the K1 set may include an inapplicable HARQ-ACK feedback timing value (e.g., a non-numerical value, an infinity value or a negative value), which indicates that a slot for transmitting the HARQ-ACK feedback is not available. In response to the inapplicable value, the UE should wait for another DCI format indicating an applicable HARQ-ACK feedback timing value to transmit the HARQ-ACK feedback corresponding to the PDSCH.

In operation 613, the UE may transmit the HARQ-ACK feedback to the BS in the second slot. The HARQ-ACK feedback may be transmitted in a PUCCH or a PUSCH.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
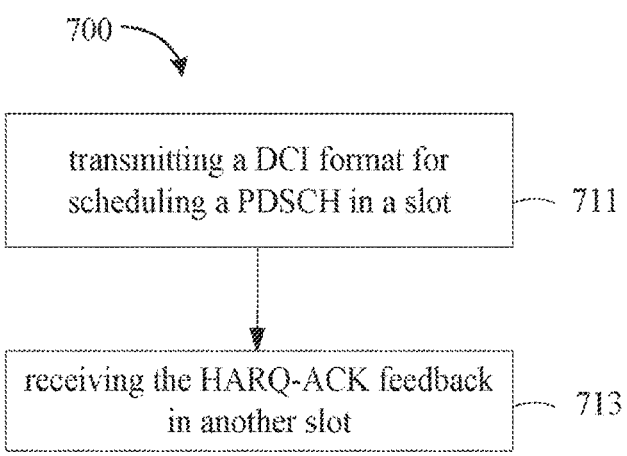
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. The procedure may be performed by a BS, for example, BS 102 in FIG. 1.

Referring to FIG. 7, in operation 711, a BS may transmit a DCI format (hereinafter, "the first DCI format") for scheduling a PDSCH in a slot (hereinafter, "the first slot") to a UE. The first DCI format may include an indicator (hereinafter, "the first indicator") for the UE to determine another slot (hereinafter, "the second slot") for transmitting HARQ-ACK feedback corresponding to the PDSCH. The first indicator may be the HARQ-ACK feedback timing indicator as described above. The second slot for transmitting the corresponding HARQ-ACK feedback may be determined based at least on the first indicator according to one of the methods as described above. In operation 713, the BS may receive the HARQ-ACK feedback in the second slot. The HARQ-ACK feedback may be carried in a PUCCH or a PUSCH.

In some embodiments, a code point of the first indicator may indicate that a slot for transmitting the HARQ-ACK feedback is not available. In response to the first indicator indicating such code point, the BS may transmit to the UE another DCI format, indicating an applicable first indicator to transmit the HARQ-ACK feedback corresponding to the PDSCH.

For example, in some embodiments of the present disclosure, the UE and the BS may operate in an unlicensed spectrum. The first slot may be within a DL burst of a COT and the second slot may be within a UL burst of the COT.

The BS may transmit a RRC signaling message to the UE to configure a HARQ-ACK feedback timing value set (e.g., K1 set); or the K1 set may be predefined. The first indicator may indicate one of an offset between a slot where the UL burst starts and the second slot, an offset between a slot where the DL burst ends and the second slot, and an offset between a slot where the COT ends and the second slot. Based on the first indicator, a HARQ-ACK feedback timing value from the K1 set may be selected.

The BS may transmit another DCI format (hereinafter, "the second DCI format") to the UE. The second DCI format may indicate the structure of the COT. For example, the second DCI format may indicate one of: the slot where the UL burst starts, the slot where the DL burst ends, the remaining duration of the COT, the slot where the COT ends, and a structure of the DL burst and the UL burst of the COT. The second slot for transmitting the corresponding HARQ-ACK feedback may be determined further based on the second DCI format. For example, the second slot may be determined based on the selected HARQ-ACK feedback timing value and the second DCI format.

In some embodiments, the K1 set may include an inapplicable HARQ-ACK feedback timing value (e.g., a non-numerical value, an infinity value or a negative value), which indicates that a slot for transmitting the HARQ-ACK feedback is not available. In response to the first DCI format (e.g., the first indicator) indicating such inapplicable value, the BS may transmit to the UE another DCI format, indicating an applicable HARQ-ACK feedback timing value to transmit the HARQ-ACK feedback corresponding to the PDSCH.

In some embodiments of the present disclosure, the BS may transmit a RRC signaling message to the UE to configure a plurality of HARQ-ACK feedback timing value sets (e.g., a plurality of K1 sets); or the plurality of K1 sets may be predefined. The values in the K1 sets may indicate a slot level offset between the slot where the PDSCH is scheduled and the slot where the corresponding HARQ-ACK feedback is to be transmitted. The first indicator in the DCI format may indicate a HARQ-ACK feedback timing value from a specific K1 set (hereinafter, "the first HARQ-ACK feedback timing value set") among the plurality of K1 sets.

In some examples, the DCI format may include another indicator (hereinafter, "the second indicator") indicating the first HARQ-ACK feedback timing value set. For example, the second indicator may be the TSI as described above.

In some embodiments, a code point of the second indicator may indicate that a slot for transmitting the HARQ-ACK feedback is not available. In some embodiments, the first HARQ-ACK feedback timing value set may include an inapplicable HARQ-ACK feedback timing value to indicate that a slot for transmitting the HARQ-ACK feedback is not available. In response to the second indicator indicating such code point or the first indicator indicating the inapplicable value, the BS may transmit to the UE another DCI format, indicating an applicable HARQ-ACK timing set or an applicable HARQ-ACK feedback timing value to transmit the HARQ-ACK feedback corresponding to the PDSCH.

In some other examples, each of the plurality of K1 sets may be configured or predefined to be associated with a corresponding SCS. In some embodiments, each K1 set may be explicitly configured with a corresponding SCS. In some embodiments, each K1 set may be implicitly configured with a corresponding SCS. For example, the mapping between a K1 set and a corresponding SCS may be predefined. The first HARQ-ACK feedback timing value set may be associated with the SCS of the PUCCH carrying the HARQ-ACK feedback or the PDSCH scheduled by the first DCI format. That is, the first HARQ-ACK feedback timing value set may be selected from the plurality of K1 sets based on the SCS of the PUCCH or the PDSCH.

In some embodiments, the first HARQ-ACK feedback timing value set may include an inapplicable HARQ-ACK feedback timing value to indicate that a slot for transmitting the HARQ-ACK feedback is not available. In response to the first indicator indicating such inapplicable value, the BS may transmit to the UE another DCI format, indicating an applicable HARQ-ACK feedback timing value to transmit the HARQ-ACK feedback corresponding to the PDSCH.

In some embodiments of the present disclosure, the BS may transmit a RRC signaling message to the UE to configure a HARQ-ACK feedback timing value set (e.g., a K1 set); or the K1 set may be predefined. The first indicator in the DCI format may indicate a HARQ-ACK feedback timing value from the K1 set. A time unit may be applied to the indicated HARQ-ACK feedback timing value. The second slot may be determined based on an offset with reference to the first slot, which may be determined based on the time unit and the indicated HARQ-ACK feedback timing value. For example, assuming that the K1 set is (1, 2, 3, 4, 5, 6, 7, 8), the first indicator being 0 may indicate a first value (i.e., 1) in the K1 set. When the time unit is set to 4, the offset between the first slot and the second slot may be 1*4=4. That is, assuming that the first slot is in slot n, the second slot is in slot n+4.

In some examples, the time unit may be configured by RRC signaling from a set of candidate values. For example, the BS may transmit a RRC signaling message to the UE to indicate a specific candidate value from the BS. The BS may not need to notify the UE the set of candidate values. In some examples, the time unit may be associated with the SCS of the PUCCH carrying the HARQ-ACK feedback or the PDSCH scheduled by the first DCI format. For example, the UE may implicitly determine the time unit according to the SCS of the PUCCH or PDSCH. In some examples, the time unit may be indicated by the first DCI format from a set of candidate values. The BS may transmit a RRC signaling message to the UE to indicate the set of candidate values or the set of candidate values may be predefined.

In some embodiments, a code point of the time unit may be reserved to indicate that the HARQ-ACK feedback timing value is not available in the monitoring occasion of the current DCI format. In some embodiments, the K1 set or the set of candidate values for the time unit may include an inapplicable value (e.g., a non-numerical value, an infinity value or a negative value), which indicates that a slot for transmitting the HARQ-ACK feedback is not available. In response to such code point or the inapplicable value, the BS may transmit to the UE another DCI format, indicating an applicable time unit or an applicable HARQ-ACK feedback timing value to transmit the HARQ-ACK feedback corresponding to the PDSCH.

In some embodiments of the present disclosure, the UE and the BS may operate in an unlicensed spectrum Both the first slot and the second slot may be within a COT. The maximum duration of the COT may be equally divided to a number of time segments. The first indicator may indicate a HARQ-ACK feedback timing value (e.g., a K1 set) from a HARQ-ACK feedback timing value set, which may be based on the number of time segments.

In some examples, the BS may transmit a RRC signaling message to the UE to configure the K1 set; or the K1 set may be predefined. In some examples, the BS may transmit a RRC signaling message to the UE to configure the number of time segments within the maximum duration of the COT; or the number of time segments may be predefined.

In some embodiments, the K1 set may include an inapplicable HARQ-ACK feedback timing value (e.g., a non-numerical value, an infinity value or a negative value), which indicates that a slot for transmitting the HARQ-ACK feedback is not available. In response to the inapplicable value, the BS may transmit to the UE another DCI format, indicating an applicable HARQ-ACK feedback timing value to transmit the HARQ-ACK feedback corresponding to the PDSCH.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
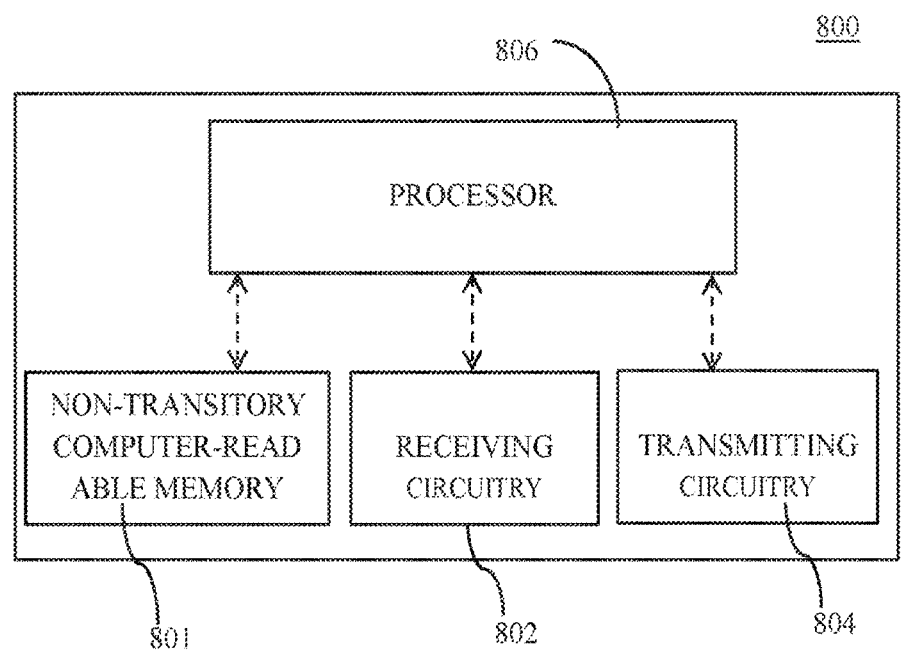
FIG. 8 illustrates a block diagram of an exemplary apparatus in accordance with some embodiments of the present disclosure.

FIG. 8 illustrates a block diagram of an exemplary apparatus 800 according to some embodiments of the present disclosure.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The apparatus 800 may be a base station side apparatus (e.g., a BS) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 are combined into a single device, such as a transceiver. In certain embodiments of the present application, the apparatus 800 may further include an input device, a memory, and/or other components.

In some embodiments of the present disclosure, the non-transitory computer-readable medium 801 may have stored thereon computer-executable instructions to cause a processor to implement the method with respect to the UEs as described above. For example, the computer-executable instructions, when executed, cause the processor 806 interacting with receiving circuitry 802 and transmitting circuitry 804, so as to perform the operations with respect to the UEs described in FIGS. 1-6.

In some embodiments of the present disclosure, the non-transitory computer-readable medium 801 may have stored thereon computer-executable instructions to cause a processor to implement the method with respect to the BSs as described above. For example, the computer-executable instructions, when executed, cause the processor 806 interacting with receiving circuitry 802 and transmitting circuitry 804, so as to perform the operations with respect to the BSs described in FIGS. 1-5 and 7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed is:

1. A user equipment (UE) for wireless communication, comprising:
   at least one memory; and at least one processor coupled with the at least one memory and configured to cause the UE to:
   receive, from a base station (BS), a first downlink control information (DCI) format for scheduling a physical downlink shared channel (PDSCH) in a first slot, wherein the first DCI format includes a first indicator for the UE to determine a second slot for transmitting hybrid automatic repeat request acknowledgement (HARQ-ACK) feedback corresponding to the PDSCH and a second indicator, wherein the second indicator is a HARQ-ACK feedback timing set indicator (TSI) that indicates a first HARQ-ACK feedback timing value set of a plurality of HARQ-ACK feedback timing value sets; and
   transmit, to the BS, the HARQ-ACK feedback in a physical uplink control channel (PUCCH) in the second slot.

2. The UE of claim 1, wherein the first slot is within a downlink (DL) burst of a channel occupancy time (COT) and the second slot is within an uplink (UL) burst of the COT.

3. The UE of claim 2, wherein the first indicator indicates one of:
   an offset between a slot where the UL burst starts and the second slot;
   an offset between a slot where the DL burst ends and the second slot; or
   an offset between a slot where the COT ends and the second slot.

4. The UE of claim 3, wherein the at least one processor is configured to cause the UE to:
   receive a second DCI format for indicating at least one of the following:
   the slot where the UL burst starts;
   the slot where the DL burst ends;
   a remaining duration of the COT;
   the slot where the COT ends; or
   a structure of the DL burst and the UL burst of the COT; and
   wherein the second slot is determined further based on the second DCI format.

5. The UE of claim 1, wherein the first indicator indicates a value from the first HARQ-ACK feedback timing value set among the plurality of HARQ-ACK feedback timing value sets.

6. The UE of claim 1, wherein a code point of the second indicator indicates that a slot for transmitting the HARQ-ACK feedback is not available.

7. The UE of claim 1, wherein the first HARQ-ACK feedback timing value set includes an inapplicable HARQ-ACK feedback timing value for indicating that a slot for transmitting the HARQ-ACK feedback is not available.

8. The UE of claim 1, wherein the plurality of HARQ-ACK feedback timing value sets are configured by radio resource control (RRC) signaling and each of the plurality of HARQ-ACK feedback timing value sets is configured or predefined to be associated with a subcarrier spacing (SCS).

9. The UE of claim 8, wherein the first HARQ-ACK feedback timing value set is associated with the SCS of the PUCCH or the PDSCH.

10. The UE of claim 1, wherein the at least one processor is configured to cause the UE to:
  determine a time unit of HARQ-ACK feedback timing value, wherein the HARQ-ACK feedback timing value is indicated by the first indicator from a HARQ-ACK feedback timing value set,
  wherein the second slot is determined based on an offset with reference to the first slot and the offset is determined based on the time unit and the HARQ-ACK feedback timing value.

11. The UE of claim 10, wherein one or more of:
  the time unit is configured by radio resource control (RRC) signaling from a set of candidate values;
  the time unit is associated with a subcarrier spacing (SCS) of the PDSCH or the PUCCH; or
  the time unit is indicated by the first DCI format from a set of candidate values.

12. The UE of claim 1, wherein both the first slot and the second slot are within a COT and a maximum duration of the COT is equally divided to a number of time segments.

13. The UE of claim 12, wherein the first indicator indicates a HARQ-ACK feedback timing value from a HARQ-ACK feedback timing value set, and the HARQ-ACK feedback timing value set is based on the number of time segments.

14. A base station for wireless communication, comprising:
  at least one memory; and at least one processor coupled with the at least one memory and operable to cause the base station to:
  transmit a first downlink control information (DCI) format for scheduling a physical downlink shared channel (PDSCH) in a first slot, wherein the first DCI format includes a first indicator for a user equipment (UE) to determine a second slot for transmitting hybrid automatic repeat request acknowledgement (HARQ-ACK) feedback corresponding to the PDSCH and a second indicator, wherein the second indicator is a HARQ-ACK feedback timing set indicator (TSI) that indicates a first HARQ-ACK feedback timing value set of a plurality of HARQ-ACK feedback timing value sets; and
  receive, from the UE, the HARQ-ACK feedback in a physical uplink control channel (PUCCH) in the second slot.

15. The base station of claim 14, wherein the first slot is within a downlink (DL) burst of a channel occupancy time (COT) and the second slot is within an uplink (UL) burst of the COT.

16. The base station of claim 15, wherein the first indicator indicates at least one of:
  an offset between a slot where the UL burst starts and the second slot;
  an offset between a slot where the DL burst ends and the second slot; or
  an offset between a slot where the COT ends and the second slot.

17. The base station of claim 16, wherein the at least one processor is configured to cause the base station to:
  transmit a second DCI format for indicating at least one of the following:
    the slot where the UL burst starts;
    the slot where the DL burst ends;
    a remaining duration of the COT;
    the slot where the COT ends; or
    a structure of the DL burst and the UL burst of the COT; and
  wherein the second slot is determined further based on the second DCI format.

18. A method performed by a user equipment (UE), the method comprising:
  receiving, from a base station (BS), a first downlink control information (DCI) format for scheduling a physical downlink shared channel (PDSCH) in a first slot, wherein the first DCI format includes a first indicator for the UE to determine a second slot for transmitting hybrid automatic repeat request acknowledgement (HARQ-ACK) feedback corresponding to the PDSCH and a second indicator, wherein the second indicator is a HARQ-ACK feedback timing set indicator (TSI) that indicates a first HARQ-ACK feedback timing value set of a plurality of HARQ-ACK feedback timing value sets; and
  transmitting, to the BS, the HARQ-ACK feedback in a physical uplink control channel (PUCCH) in the second slot.

19. A method performed by a base station, the method comprising:
  transmitting a first downlink control information (DCI) format for scheduling a physical downlink shared channel (PDSCH) in a first slot, wherein the first DCI format includes a first indicator for a user equipment (UE) to determine a second slot for transmitting hybrid automatic repeat request acknowledgement (HARQ-ACK) feedback corresponding to the PDSCH and a second indicator, wherein the second indicator is a HARQ-ACK feedback timing set indicator (TSI) that indicates a first HARQ-ACK feedback timing value set of a plurality of HARQ-ACK feedback timing value sets; and
  receiving, from the UE, the HARQ-ACK feedback in a physical uplink control channel (PUCCH) in the second slot.

20. The base station of claim 14, wherein a code point of the second indicator indicates that a slot for transmitting the HARQ-ACK feedback is not available.

* * * * *